March 15, 1960     E. G. SCHAIRER     2,928,133
METHOD OF PRODUCING SHEET MATERIAL
Filed March 20, 1958
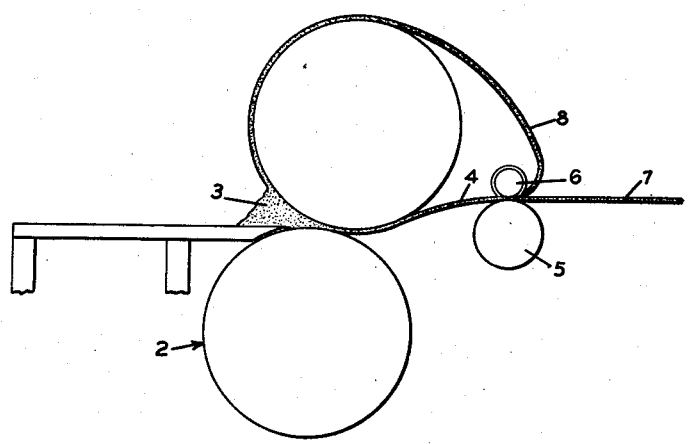
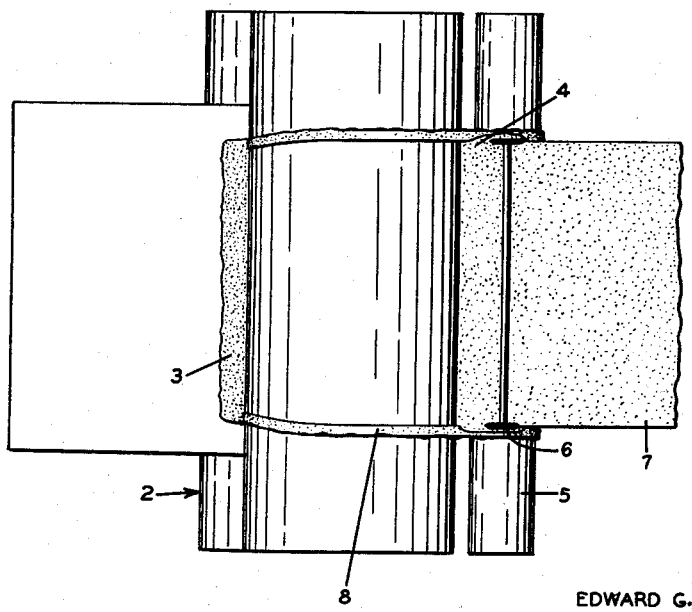
INVENTOR
EDWARD G. SCHAIRER

United States Patent Office 2,928,133
Patented Mar. 15, 1960

2,928,133

METHOD OF PRODUCING SHEET MATERIAL

Edward G. Schairer, Manheim Township, Lancaster County, Pa., assignor to Armstrong Cork Company, Lancaster, Pa., a corporation of Pennsylvania Application March 20, 1958, Serial No. 722,783

2 Claims. (Cl. 18—48.8)

This invention relates to a method of producing vinyl sheet material and particularly to a method of producing vinyl sheet material having tear-resistant edges.

In the manufacture of vinyl sheet material on a conventional calender, it is customary to produce a continuous sheet of a width close to the maximum possible on the calender rolls. In this type of operation the selvage edge is trimmed from the sheet by means of a cutter working against the roll in an area where roll scoring is not a problem inasmuch as it engages the roll beyond the area used for calendering a final sheet. When narrow sheets are produced on conventional calenders, different trimming arrangement must be made because of the selvage trimming knife operating directly on the roll and scoring the roll to such an extent that the standard width sheet material cannot be subsequently calendered on the equipment. For example, conventional calenders usually produce a sheet approximately 72" wide. In order to produce this sheet, the calender rolls are of necessity longer than the 72" sheet desired. The sheet is calendered on the machine to a width greater than the width desired and is removed by a cutter which cuts directly against the calender roll leaving a selvage band on the calender roll. If it is felt desirable to calender a sheet of less width, it is impossible to use the same type cutter inasmuch as such cutter would score the calender roll rendering it unsuitable for making material of wider dimensions later.

In making these narrow sheets, if the granular raw material is fed to the nip of the calender in an area only wide enough to produce a final sheet of the desired width, the edges of the sheet so produced are irregular and have a rather lacelike appearance with a large number of fine hairline cracks from the edge extending into the sheet. These fine cracks quite often result in tears during subsequent handling of the sheet in operations such as laminating or the like. These lacelike edges must be removed before the sheet is laminated to a backing because such material would not be salable. Even if these lacelike edges are trimmed off before lamination, the cut-off portion must either be thrown away or completely reprocessed.

In order to avoid the production of a narrow sheet having the properties outlined above, it has been found necessary to trim the selvage edges from the calendered sheet. If this trimming operation is carried out immediately after the sheet is removed from the calender, the thermoplasticity of the composition makes it possible to trim the edges without tearing or mutilating the edge. The trimmings from these edges are then immediately reused in a manner to be described later.

It has also been found desirable during subsequent processing operations, and particularly a subsequent laminating operation, to have a sheet with elongated toughened edges so that edge tears do not occur when the sheet is placed under tension in the laminating or other subsequent manufacturing operation.

With the invention here involved it is possible to produce a calendered vinyl sheet with reinforced, elongated, crack-free edges regardless of width up to the maximum permitted on a conventional calender, continuously using the trimmed-off material with no scrap. This is accomplished by producing a vinyl sheet of a width in excess of that desired and trimming from the edges of such vinyl sheet the excess selvage bands. These selvage bands are fed back into the nip of the calender at the edges of the sheet being formed so that the sheet is formed with edges of recalendered material which has a reinforcing effect. These selvage edges will be mixed with fresh granules of color composition so that the area constituting the selvage edge will be made partially from this recalendered strip and also from fresh composition. This means that the recalendered selvage edge will extend into the body of the sheet after it is trimmed to the desired width.

It is an object of this invention to provide a method of calendering a vinyl sheet to the desired width having reinforced and slightly elongated edges and with the elimination of scrap.

In calendering or roll consolidating a sheet from thermoplastic composition such as the usual vinyl compositions used in sheet formation for floor or wall coverings or the like, it is well-known that temperature control of the composition as it enters the calender and of the calender rolls themselves plays an important part in determining the properties of the finally calendered sheet. It will be seen from this that the properties of some areas of a sheet may differ from the properties of other areas of the same sheet if the composition forming these areas is subjected to different calendering conditions during sheet formation. For example, if a mass of thermoplastic composition is fed to the nip of a sheeting calender and a certain portion of its is cooler than the remainder of the composition, the portion of the sheet made from the cool particles will tend to elongate slightly.

This phenomenon has led to a desire to form a sheet with the edges calendered from thermoplastic compositions maintained at a temperature slightly lower than the temperature of the remainder of the sheet. A sheet so produced has edges which appear to be slightly longer than the remainder of the sheet; and when this sheet is placed under tension during subsequent manufacturing operations, there is less stress on the edges than on the other areas of the sheet. This eliminates edge tears.

Due to the method used in feeding granulated thermoplastic composition to a sheeting calender, it is rather difficult to heat the granules forming the edges of the sheet to a lesser extent than the granules forming the balance of the sheet.

In order to accomplish the object described above, it has been found that in calendering a vinyl sheet on a calender which is of a width substantially greater than the desired width of the vinyl sheet, the calendering operation can be performed by feeding the granular composition from which the sheet is to be formed in the nip of a calender in a restricted zone substantially the same width as the desired width of the final sheet. During the calendering process this material will extrude out the edges for a distance of probably two or three inches forming a sheet of an oven-all width probably 6" greater than the desired width. This 6" excess, 3" on each side, is removed from the edge of the sheet by a special cutting device over which the sheet material passes after it leaves the calender. These cut-off selvage bands are fed back into the nip of the calender along the edges of the restricted zone into which the fresh composition is fed. These selvage bands, due to the fact that they have passed through the calender and back into the nip, are, of course, at a temperature somewhat lower than the temperature of the composition being fed to the calender. The selvage bands are mixed with fresh composition in the edge portions and are recalendered as they pass through the calender rolls a second time. The edges of the sheet are now constituted of these recalendered selvage bands plus fresh composition intermingled with the selvage bands. When the edge of this sheet is trimmed to the desired width, a portion of the edge of the trimmed sheet will be constituted of selvage bands. Because of the fact that these selvage bands have been recalendered at a temperature lower than the temperature of the fresh composition, they are tougher and slightly longer. This greatly reduces the tears in the edge of the sheet which occur during subsequent manufacturing operations. Furthermore there is no scrap or material which must be reprocessed.

When the sheet so produced is heated prior to laminating and tension is placed on the sheet, there is no tendency for the edge of the sheet to tear causing defective material.

The attached drawing is illustrative of the method herein described. The two-roll calender 2 is supplied a quantity of granular material 3 from a bank in the nip of the calender. The calendering action of the calender 2 consolidates these granules into a sheet 4 which passes over an idler roll 5 against which operates a pair of cutters 6 which cuts a sheet 7 of the desired width, and the selvage bands 8 are directed back onto the roll and are carried into the nip at the edges of the bank 3 and are reconsolidated into the selvage edge of the sheet.

It will be obvious to those skilled in the art that the method which I employ in producing sheet material, and particularly plastic sheet material such as those made from thermoplastic vinyl compositions, has a greater tear resistance and is more easily handled than the conventional material.

I claim:

1. In the method of producing a vinyl sheet having reinforced edges from a bank of vinyl composition disposed in the nip of a calender roll, the steps comprising calendering a vinyl sheet of a width greater than the final width desired from a bank of material heated to calendering temperature, cutting the edges from said calendered sheet after the sheet is removed from its engagement with the calender rolls, and feeding said cut edges into the nip of the calender along the edges of the bank of material disposed in the nip to be recalendered along the edges of the sheet only at a temperature below the temperature of the fresh composition being supplied to the calender, said cool recalendered edges being of a width greater than the width of the material to be cut from the edge.

2. In the method of producing a sheet having reinforced edges from a bank of thermoplastic composition disposed in the nip of a calender roll, the steps comprising calendering a sheet of a width greater than the final width desired from said bank of material heated to calendering temperature, cutting the edges from said calendered sheet after the sheet is removed from its engagement with the calender rolls, and feeding said cut edges into the nip of the calender along the edges of the bank of material disposed in the nip to be recalendered along the edges of the sheet only at a temperature below the temperature of the fresh composition supplied to the calender, said cool recalendered edges being of a width greater than the width of the material to be cut from the edge.

References Cited in the file of this patent

UNITED STATES PATENTS

| | | |
|---|---|---|
| 1,402,160 | Gwozdz | Jan. 3, 1922 |
| 1,612,724 | Housekeeper | Dec. 28, 1926 |
| 1,750,708 | Edwards | Mar. 18, 1930 |
| 2,364,248 | Spencer | Dec. 5, 1944 |
| 2,779,387 | Schairer | Jan. 29, 1957 |
| 2,840,137 | Wortz | June 24, 1958 |